May 12, 1959

R. S. BLACKSHEAR 2,886,275

DESK TELEPHONE STAND

Filed July 16, 1953

INVENTOR.
ROY S. BLACKSHEAR

BY Victor J. Evans & Co.

ATTORNEYS

United States Patent Office 2,886,275

Patented May 12, 1959

2,886,275

DESK TELEPHONE STAND

Roy S. Blackshear, Hilo, Territory of Hawaii

Application July 16, 1953, Serial No. 368,440

1 Claim. (Cl. 248—175)

This invention relates to stands for suspending desk telephone instruments above and in spaced relation to the upper surface of a desk, table, stand or the like, and in particular a stand having telephone instrument gripping elements supported by posts whereby an open area is provided below the telephone instrument so that a telephone book or directory or the like may be placed on a desk below the telephone instrument and may be removed, used, and replaced without moving the telephone instrument.

The purpose of this invention is to economize space on a desk or the like and also to make it convenient to maintain a telephone directory in close proximity to a telephone.

It is common practice to place a telephone directory below a telephone instrument on a desk or the like and when it is desired to use the telephone directory it is necessary to move the telephone instrument and, in some instances, the instrument is placed upon valuable papers on the desk. With this thought in mind, this invention contemplates a stand for suspending a telephone instrument about a telephone book or directory whereby the telephone may remain in position as the telephone directory is withdrawn, used, and replaced.

The object of this invention is, therefore, to provide means for forming a comparatively open stand whereby a telephone may be supported in an elevated position on a desk or the like so that a telephone directory may be placed below the instrument.

Another object of the invention is to provide a stand for supporting a telephone instrument above a book or the like in which the stand is in the form of a skeleton whereby the parts are so designed that only a few parts are required.

A further object of the invention is to provide a stand for suspending a telephone instrument above an object on a desk or the like in which the stand is of an ornamental and pleasing appearance.

A still further object of the invention is to provide a stand for supporting a telephone instrument in an elevated position upon a desk or the like in which the stand is of a simple and economical construction.

With these and other objects and advantages in view, the invention embodies a pair of horizontally disposed bars having telephone instrument base receiving sections therein with posts supporting the bars whereby an open area is provided below the stand.

The invention also includes a horizontal surface formed with a sheet of material or a plurality of wires or bars with vertically disposed supporting elements of various types and designs depending therefrom.

Other features and advantages of the invention will appear from the following description taken in connection with the drawings, wherein.

Figure 1:
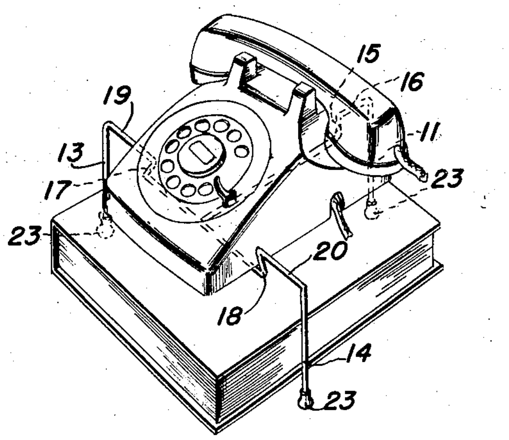
Figure 1 is a perspective view showing the device in use in which a telephone instrument is suspended by the stand above a telephone directory.

Referring now to the drawings wherein like reference characters denote corresponding parts the telephone instrument stand, as illustrated in the figures, includes a longitudinally disposed bar 10 having a leg 11 on the extended end and a transversely disposed bar 12 having legs 13 and 14 on the ends.

The bar 10 is provided with an offset section 15, which is slightly inclined, and the upper end of the section 15 is connected to the leg 11 with a horizontally disposed bar or portion 16. The transversely disposed bar or arm 12 is provided with similar offset sections 17 and 18 and the upper ends of the sections 17 and 18 are connected to the legs 13 and 14, respectively, with horizontally disposed bars or strips 19 and 20.

Figure 3:
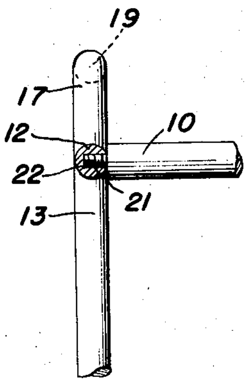
Figure 3 is a detail, with parts shown in section illustrating a method of connecting one rod of the stand to another, the sectional part of said figure being taken on line 3—3 of Figure 2.

The longitudinally disposed bar 10 is connected to the bar 12, as illustrated in Figure 3, wherein a threaded stud 21 on the end of the bar 10 is threaded into a socket 22 in the bar 12. It will be understood, however, that the bars may be connected by welding or other suitable means.

Figure 2:
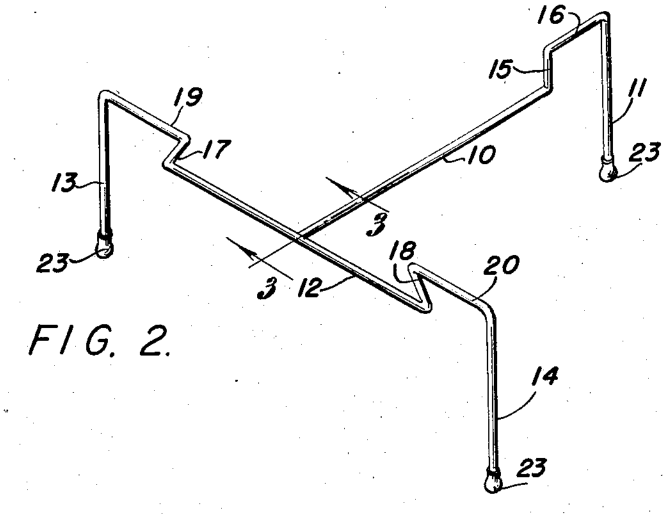
Figure 2 is a perspective view showing a comparatively simple form of stand wherein horizontally disposed bars are supported with three legs or posts.

The lower ends of the posts or legs are provided with knobs 23 that may be formed of rubber or other suitable resilient material and it will be understood that the rubber or friction elements may be formed as illustrated in Figure 2.

It will be understood that the stand may be formed in various designs, however, the stand includes, basically, a horizontally disposed member supported with vertical members whereby a telephone instrument is supported in spaced relation to the upper surface of a desk, table, stand, or the like and a book, such as a telephone directory may be freely positioned in the area in the lower part of the stand. The stand may be formed of sheet material, wire, rods or other suitable material or a combination of several materials, and the materials may be coated with rubber, Lastex, or a suitable coating.

It will be understood that modifications, within the scope of the appended claim, may be made in the design and arrangement of parts without departing from the spirit of the invention.

What is claimed is:

In a telephone stand, a horizontally disposed bar provided with an inclined offset section extending upwardly from said bar and terminating in a horizontally disposed portion, a vertically disposed leg extending down from said horizontally disposed portion, a resilient knob on the lower end of said leg, a horizontally disposed arm extending transversely with respect to the front end of said bar and including a pair of offset sections, said last named offset sections being arranged in opposed angular relation with respect to each other so that the lower ends of said last named sections are further apart than their upper ends thereof, horizontally disposed strips extending outwardly from said last named offset sections, vertically disposed legs extending downwardly from the ends of said strips, a resilient knob on the lower end of each of said legs, there being a threaded socket in said arm, said socket being arranged intermediate the ends of said arm, and a threaded stud of reduced diameter on the front end of said bar arranged in engagement with said socket, the horizontally disposed bar and the horizontally disposed arm providing a support for a telephone and the offset section of said bar and the offset sections of said arm providing means for retaining the telephone on the support, the space below said offset sections adapted to receive a telephone directory.

References Cited in the file of this patent

UNITED STATES PATENTS

| | | |
|---|---|---|
| 612,663 | Haubs | Oct. 18, 1898 |
| 849,290 | Vanderbilt | Apr. 2, 1907 |
| 1,001,416 | Lloyd | Aug. 22, 1911 |
| 1,180,735 | Murray | Apr. 25, 1916 |
| 1,348,807 | Kivlan | Aug. 3, 1920 |
| 1,518,876 | Rosine | Dec. 9, 1924 |
| 1,849,100 | Little | Mar. 15, 1932 |
| 2,114,735 | Crilly | Apr. 19, 1938 |
| 2,608,024 | Torrence | Aug. 26, 1952 |

FOREIGN PATENTS

| | | |
|---|---|---|
| 675,077 | Great Britain | July 2, 1952 |